Patented Jan. 31, 1950

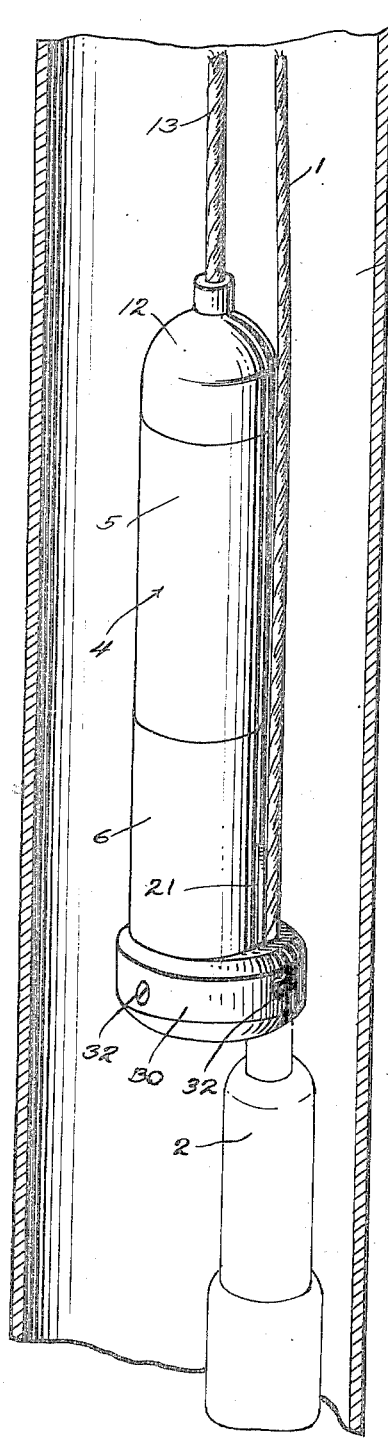
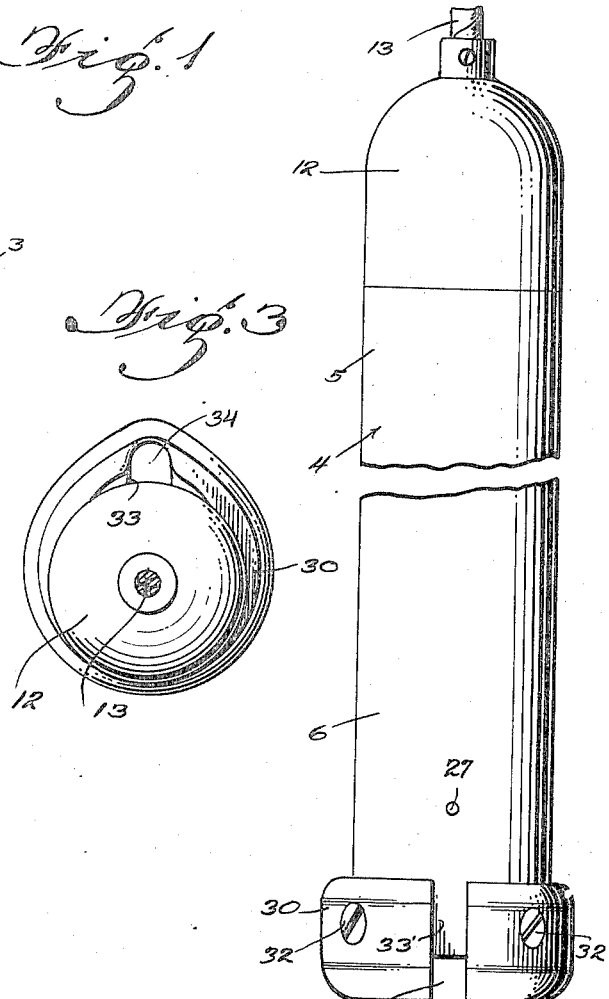
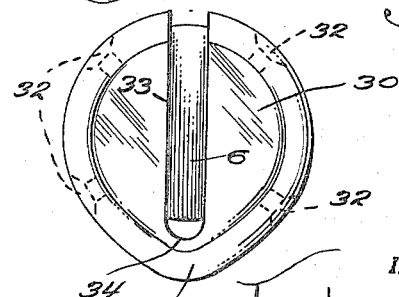

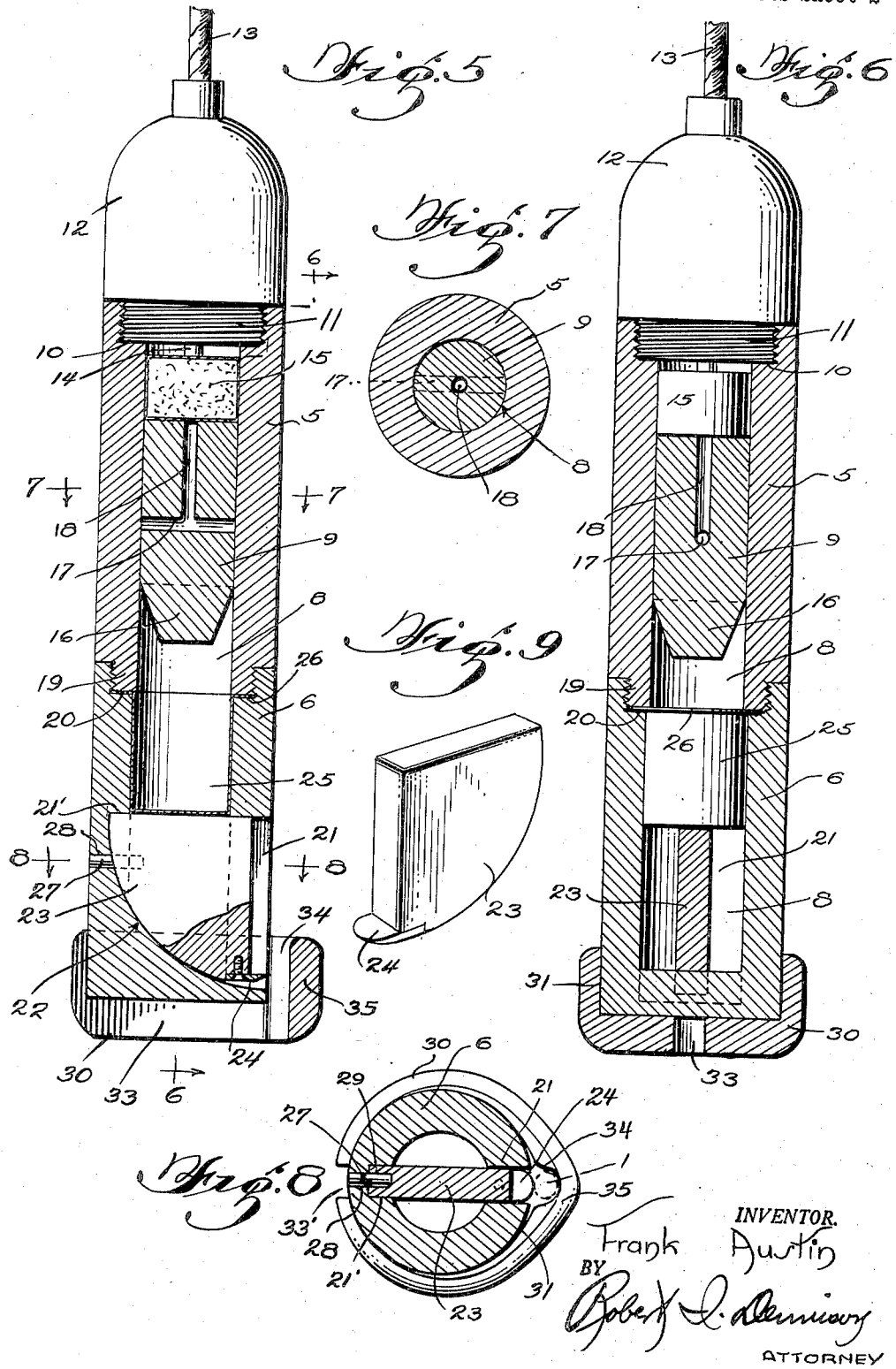

2,495,953

UNITED STATES PATENT OFFICE 2,495,953

WIRE LINE CUTTER

Frank Austin, Long Beach, Calif.

Application August 26, 1946, Serial No. 693,032

2 Claims. (Cl. 255—34)

This invention relates to a cable cutter and more particularly to a cutter by means of which a cable extending downwardly into the casing of an oil well and carrying a fishing tool, bailer, or the like may be cut close to the fishing tool or bailer.

During various subsurface operations in the cleaning of oil wells, it often happens that the tools become stuck at the bottom of the well. When this occurs, it is frequently impossible to dislodge the bailer or fishing tool attached to the cable by exerting pull upon the cable as the cable is liable to be broken, and if the cable is broken at some distance from the tool it will foul the well casing. The current practice is to use a portable well pulling machine and lower a number of heavy tools, stems, jars, and a jar type cutter into the well casing and impart jarring blows to the fishing tool until the cable is cut or worn through. This has not been found satisfactory as the tools lowered into the well sometimes will also become stuck and great difficulty is then experienced in clearing the well.

Therefore, one object of the invention is to provide a cable cutter which may be very easily lowered into an oil well and a blade constituting an element of the device driven against the cable close to the fishing tool at the lower end of the cable.

Another object of the invention is to provide a cable cutter, wherein the blade is driven against the cable to be cut by action of a plunger which is slidable vertically in the barrel or casing of the cutter and impelled downwardly into striking engagement with the cable by the force of an explosion in the upper portion of the barrel.

Another object of the invention is to provide a cable cutter having means at its lower end for engaging the cable carrying the fishing tool and guiding downward movement of the cutter through the well casing and holding the cutter close to the fishing tool so that when the cutter is operated the cable carrying the fish will be cut close to the fishing tool.

Another object of the invention is to provide a cable cutter so formed that it may be easily taken apart for loading when it is to be used and for cleaning and resetting of a blade-carrying plate.

Other objects will appear during the course of the following description.

The invention is illustrated in the accompanying drawings wherein:

Figure 1 is a perspective view showing the improved cable cutter in position for use.

Figure 2 is a view showing the cable cutter in elevation.

Figure 3 is a top plan view of the cable cutter.

Figure 4 is a bottom view.

Figure 5 is a sectional view taken longitudinally through the cable cutter.

Figure 6 is a longitudinal sectional view taken at right angles to Figure 5, the view being along line 6—6 of Figure 5.

Figure 7 is a transverse sectional view taken along line 7—7 of Figure 5.

Figure 8 is a sectional view taken along the line 8—8 of Figure 5.

Figure 9 is a perspective view of the blade-carrying plate.

This improved cable cutter is used for cutting a cable 1 and thus releasing a fishing tool, bailer, or the like 2, which has been lowered into the casing 3 of an oil well and become caught so that it cannot be withdrawn from the well. The cutter has a barrel or cylindrical casing which is indicated in general by the numeral 4 and has an upper section 5 and a lower section 6, both of which are formed of strong metal and may be of any desired length and diameter. The bores of the two sections 5 and 6 are of the same diameter and in longitudinal alignment with each other to form a chamber or passage 8 in which a plunger 9 operates. The plunger 9 has a sliding fit within the chamber or passage 8.

A socket 10 having threaded walls is formed at the upper end of the barrel to receive the threaded neck 11 of a coupling 12 which is commonly known as a rope-socket and is applied to the rope or line 13 in the usual manner. This coupling also carries a detonator 14 activated by electric current flowing through a wire in the line 13 for exploding a powder charge 15 placed in the chamber 8 close to the upper end thereof and above the plunger 9. When the powder is exploded by the detonator the plunger will be driven downwardly with great force and since its lower end is tapered to form a nose 16, it may be driven downwardly without likelihood of catching and having its downward movement checked. The plunger is drilled transversely, as shown at 17, and longitudinally from its upper end, as shown at 18, to assist its longitudinal movement through the barrel.

At its lower end, the upper section 5 of the barrel is formed with a threaded neck 19 for engagement in a threaded socket 20 formed at the upper end of the lower section 6, and upon referring to Figures 5 and 6, it will be seen that the chamber or passage 8 terminates in spaced relation to the lower end of the barrel and is intersected by a slot 21 which extends diametrically of the barrel and has its inner portion 21' cut into the wall of the barrel at a point diametrically opposite the outer portion of the slot. The wall 22 of the slot is arcuate and extends from the upper end of the inner portion 21' of the slot to the lower end of the main or outer portion of the slot.

A striking plate 23 of segmental shape is inserted through the slot 21 and has its inner corner portion fitting into the recess or inner portion 21' of the slot and its arcuate edge face portion resting against the arcuate surface or wall 22 of the slot, and from an inspection of Figure 5 it will be seen that when a blow is delivered against the flat and straight cut upper edge face of the plate by the plunger 9 the plate will be swung outwardly through the slot 21 and the sharpened edge of the blade 24 brought into cutting engagement with the cable 1 close to the fishing tool 2.

A cup-shaped sealing device 25 which is closed at its lower end fits snugly in the bore of the lower barrel section 6 and is held in place by a flange 26 formed about its upper end and clamped between the neck 19 and the bottom of the socket 20. This seal 25 prevents water in a well from entering the barrel but since it is formed of thin metal it will be readily ruptured by the falling plunger and not interfere with action of the plunger to drive the striking plate outwardly.

A pin 27 which is formed of soft metal and passed inwardly through an opening 28 in the barrel and into a socket 29 formed in the striking plate holds the striking plate in a set position and prevents premature movement of the striking plate outwardly through the slot 21.

In order to hold the cable cutter in slidable engagement with the cable 1 the barrel has been provided with a base 30 formed of strong metal and having a socket 31 into which the lower end of the barrel fits, the base being held to the barrel by screws 32. A slot 33 is formed diametrically across the base and has its inner or front end communicating with a groove 34 formed vertically through the nose 35 at the front of the base and its rear end portion 33' extending vertically through the wall of the socket 31.

By so forming the base the cable 1 may be passed through the slot 33 into the recess or groove 34 and the base then applied to the lower end of the barrel and secured by the screws 32. A sealing device cup 25 is then fitted into the lower barrel section through the upper end thereof and the neck 19 of the upper barrel section is then screwed into the socket 20 of the lower barrel section.

The plunger is shifted through the bore of the upper barrel section to the position shown in Figure 5 before the upper barrel section is applied to the lower barrel section and the powder charge 15 deposited in the barrel above the plunger and the coupling or rope socket screwed into the socket 10 at the upper end of the barrel. The cutter is then ready for use and may be lowered into the well and since the cable 1 passed through the groove 34 it will be held close to the cable as it moves downwardly through the well casing and comes to rest upon the fishing tool 2.

When the cutting device comes to a stop upon the fishing tool it is merely necessary to close a switch and current will then flow to the detonator and fire the same so that the powder charge will be exploded and the force of the exploding powder will drive the plunger downwardly through the barrel and cause it to strike the flat upper edge face of the cutter plate and swing this plate outwardly through the slot 21. As the cutter plate moves outwardly through the slot its blade 24 will be driven against the cable, cutting the same transversely and releasing the fishing tool. The cable and the cutting device may then be withdrawn from the well. This takes a very short time and may be very easily accomplished.

While I have shown the preferred embodiment of my invention, it is to be understood that various changes in the size, shape and arrangement of parts may be resorted to without departing from the spirit of the invention and the scope of the appended claims.

Having thus described the invention, what is claimed is:

1. A cable cutting device comprising a barrel having upper and lower sections in threaded engagement with each other, a rope socket threaded to the upper end of the barrel and carrying a detonator at its lower end presented towards the bore of the barrel, a plunger slidable vertically in the bore of the barrel and initially disposed in the bore of the upper barrel section, a powder charge in the upper end portion of the bore between the plunger and the detonator for driving the plunger downwardly when exploded by the detonator, the bore being closed at its lower end and the lower barrel section being formed in its lower end portion with a longitudinal slot intersecting the bore through the front portion of its wall and terminating as a recess in the rear portion of the wall of the bore, the said slot having an arcuate wall extending from the lower end of the slot to the upper end of the recess, a striker plate of segmental shape tiltable through the slot from a retracted position to an extended position and having an arcuate edge face confronting the arcuate wall of the slot and a flat horizontally extending upper edge face for striking engagement by the plunger to drive the plate outwardly through the slot to the extended position, a blade at the lower end of the plate disposed horizontally and projecting outwardly therefrom for cutting a cable when the plate is driven to the extended position, a cup-shaped sealing member fitting snugly in the bore above the striker plate with its closed lower end resting upon the upper edge face of the striker plate and adapted to be ruptured by the plunger, said sealing member having an outstanding circumferentially extending flange clamped between the connected ends of the upper and lower barrel sections to hold the sealing member in place, and a base detachably mounted at the lower end of the barrel and formed with a vertically extending recess disposed outwardly of the barrel in position for receiving a cable to be cut and with a slot extending from the recess diametrically of the base and through which the cable is adapted to be passed into the recess before applying the base to the barrel.

2. A cable cutter comprising a barrel having a longitudinal bore and formed with a vertical slot through the front portion of its wall communicating with the bore, there being a recess in the rear portion of the wall of the barrel directly opposite the slot and an arcuate surface extending from the upper end of the recess to the lower end of the slot, a segmental plate fitted into the barrel through the slot and having a flat upper edge face and an arcuate edge face resting against the arcuate surface of the barrel, a horizontal blade at the bottom of the plate projecting forwardly therefrom through the lower end of the slot and assuming a cutting position when the plate is swung forwardly by a blow upon its flat upper edge face, a plunger slidable vertically in the bore of said barrel having a tapered lower portion to facilitate downward movement into striking engagement with the plate, the plunger being formed with a transversely extending opening and with a bore extending longitudinally between the transverse opening and the upper end of the plunger and together with the transversely extending opening assisting sliding movement of the plunger, a powder charge in the upper portion of the bore of the barrel above the powder charge, a rope socket detachably engaged with the upper end of the barrel and provided with a detonator for exploding the powder charge and driving the plunger downwardly into striking engagement with the plate, and a base for the barrel detachably applied to the lower end thereof and formed with a vertical passage disposed outwardly of the barrel for receiving a cable to be cut and slidably mounting the cable cutter upon the cable.

FRANK AUSTIN.

REFERENCES CITED

The following references are of record in the file of this patent:

UNITED STATES PATENTS

| Number | Name | Date |
|---|---|---|
| 692,816 | Bell | Feb. 11, 1902 |
| 1,610,699 | Montgomery | Dec. 14, 1926 |
| 1,813,368 | Toles | July 7, 1931 |
| 2,185,303 | Kinley | Jan. 2, 1940 |